March 31, 1942.   M. YOUNG   2,278,298
STRUCTURE FOR USE IN TRIMMING CATTLE HOOFS
Filed Dec. 10, 1940   2 Sheets-Sheet 1
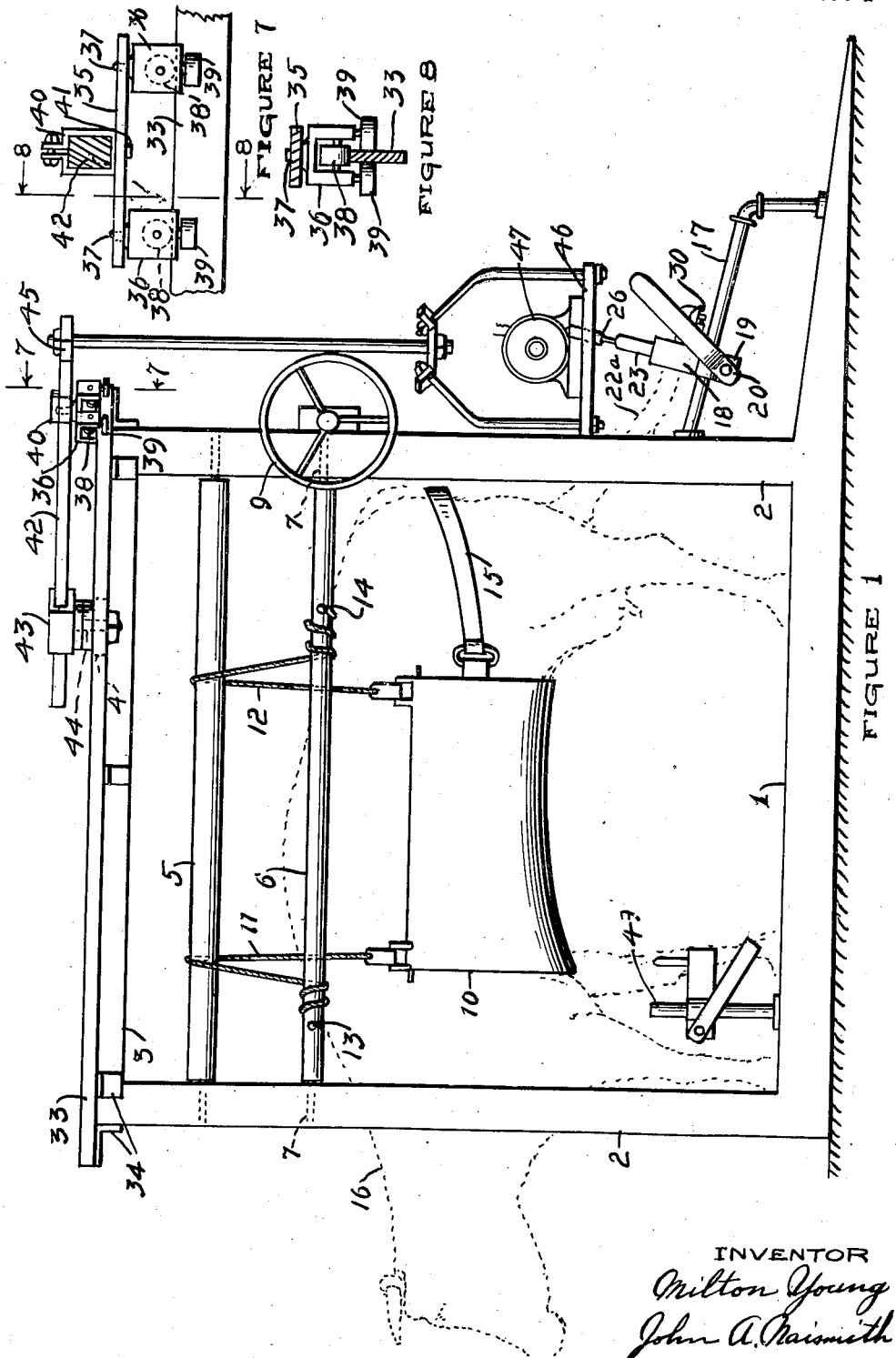
INVENTOR
Milton Young
John A. Naismith
ATTORNEY

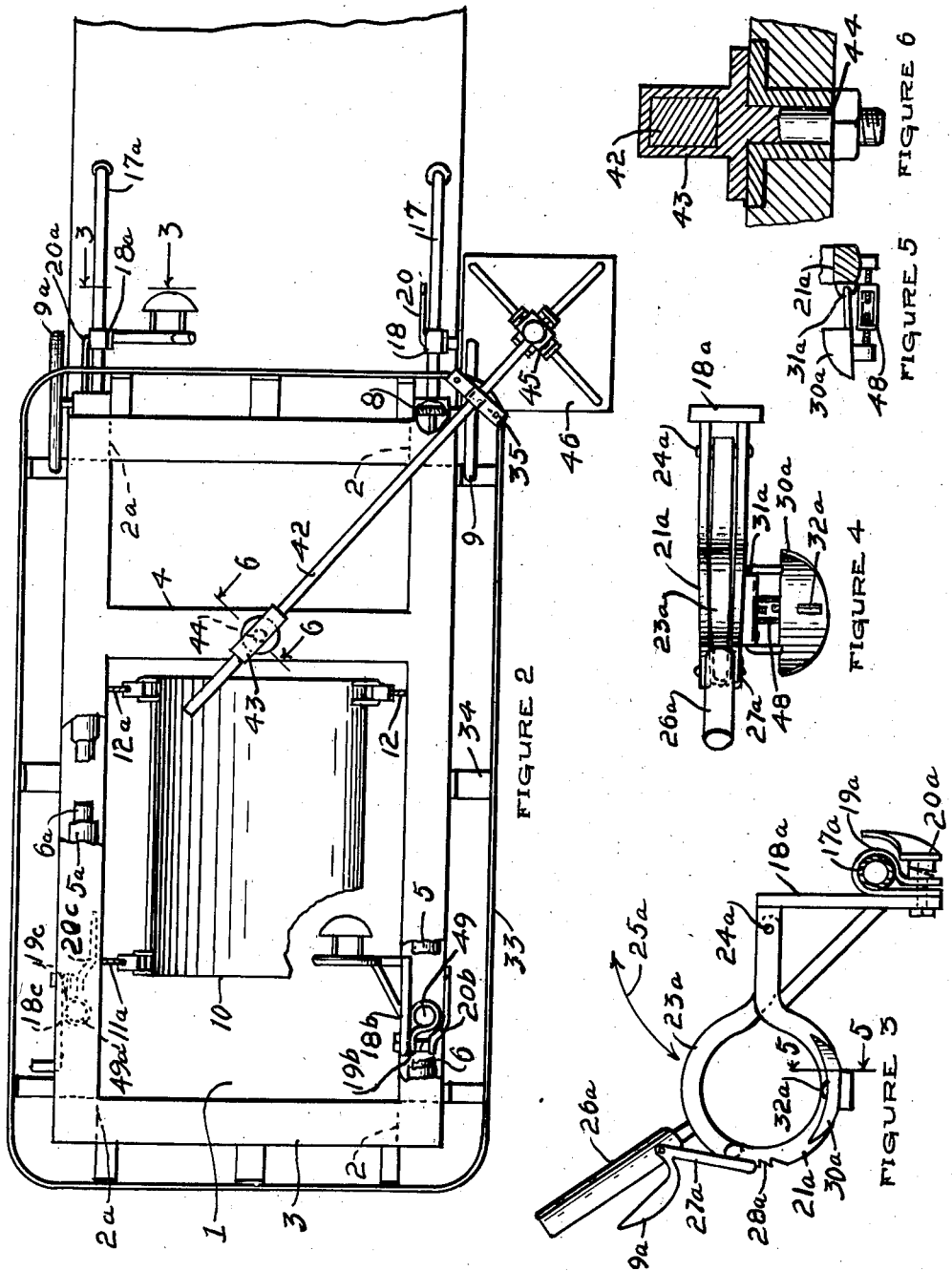

Patented Mar. 31, 1942

2,278,298

UNITED STATES PATENT OFFICE 2,278,298

STRUCTURE FOR USE IN TRIMMING CATTLE HOOFS

Milton Young, San Jose, Calif.

Application December 10, 1940, Serial No. 369,424

5 Claims. (Cl. 119—100)

The present invention relates particularly to a structure for use in the trimming of the hoofs of dairy cows.

Dairy cows, particularly those quartered in or near large cities, are so closely confined that they get but little exercise; consequently, since the horny substance of the hoofs is not worn down as fast as new growth takes place, the hoofs soon become abnormal in size and shape, frequently enlarging to such an extent as to cripple the animal involved.

It is one object of the present invention to provide a structure so constructed and arranged as to confine an animal in a practically immovable position, and at the same time permit the rigid securing of a hoof in a position to be operated upon.

It is also an object of the invention to provide a structure of the character indicated wherein hoof securing and supporting devices are adjustably associated with the structure in such a manner as to rigidly support any desired hoof in any desired position.

It is a further object of the invention to provide a structure of the character indicated equipped with means whereby hoof trimming tools may be associated therewith in such a manner that they may be quickly and easily positioned adjacent the operator regardless of which hoof he is operating upon.

Finally, it is an object of the invention to provide a structure of the character indicated that will be economical to manufacture, simple in form and construction, strong, durable, and highly efficient in its practical application.

In the drawings:

Figure 1 is a side elevation of a structure embodying my invention.

Figure 2 is a top plan view of the same with parts broken away.

Figure 3 is an enlarged view of one of the hoof supporting elements, at 3—3 Figure 2.

Figure 4 is a top plan view of the hoof supporting element as shown in Figure 3.

Figure 5 is a view of the same on line 5—5 of Figure 3.

Figure 6 is an enlarged section on line 6—6 of Figure 2.

Figure 7 is an enlarged side elevation of the truck supporting the tool carrying means.

Figure 8 is a sectional view on line 8—8 of Figure 7.

In the drawings duplicate parts are distinguished by the use of appropriate letters added to the basic indicating numerals.

Referring now more particularly to the drawings, I show at 1 a platform upon which is erected a strong, substantial framework including four upright corner posts 2 and a rectangular top frame 3 with a cross-piece 4 as shown.

The first step taken in the operation is to secure the animal against activity, and this I accomplish in the following manner.

Journaled in the front and rear posts of the structure, near the top, is a roller 5, and spaced below this roller and in parallel relation thereto is a shaft 6. Shaft 6 is also journaled in the posts as at 7 and is operated and controlled by means of a worm gear 8 and handwheel 9. The parts 5a and 6a are identical with the parts 5 and 6 and are mounted and operated in the same manner.

At 10 is shown a supporter member formed and proportioned to underlie the barrel of the animal and extend upwardly on each side. The corners of the member are attached to cables as 11—12, these cables passing upwardly over the roller 5 and thence downwardly and around the shaft 6 to which they are fastened as at 13—14. A breech strap 15 is attached to member 10 to prevent movement of the animal's tail, and hold part 10 in place.

When the animal is driven on to the platform 1 and the parts adjusted as described, the shafts 6—6a are operated to elevate the member 10, thereby lifting the body of the animal, indicated in dotted lines at 16, until a large part of its weight, or at least a material part of its weight, is taken off of its legs and it is rendered helpless to resist the operations following. In addition to this, with so much weight being taken up by the superstructure 2—3 the animal may be allowed to stand on two legs only while the other two are being worked upon.

The second step in the operation is the positioning and securing of each animal hoof in such a manner that it may be worked upon conveniently and without interruption due to the animal's movements. A separate device is provided for supporting and securing each hoof, but since they are all substantially identical, but one will be described in detail.

At 17a is an inclined rail rigidly abutting the rear post 2a. A bracket 18a is mounted on this rail by means of a strap 19a which may be tightened or loosened thereon by means of a cam lever as 20a. When the device is to be used it is placed in position by adjusting it about rail 17a and then locking it in such position by the means indicated.

The bracket 18a has a curvilinear hook-like extension 21a formed and proportioned to receive and support the lower joint of the animal's leg just above the hoof when the leg is extended rearwardly as at 22a, a position in which the bottom of the hoof is fully exposed.

To securely hold the leg in position when seated in part 21a, I provide a complementary curved member 23a pivotally mounted on the bracket at 24a to swing through the arc 25a. This member is provided with a handle 26a and a bell-crank latch 27a arranged to automatically engage a notch as 28a on part 21a when closed thereon, the latch being disengaged when desired by pressure on finger-piece 29a.

A curved plate 30a is pivotally mounted on the back of part 21a as at 31a and is formed to provide a seat for the hoof, the lug 32a in the center thereof being disposed to enter between the two halves of the hoof and separate the same. The plate 30a is adjusted about its pivotal mounting, and supported in any desired position, by means of a turnbuckle inserted between it and the part 21a as shown at 48.

Since much of the work performed on a hoof is done by means of special tools operated by an electric motor, special means is provided whereby the motor may be quickly, easily and conveniently positioned relative to the operator.

The means indicated comprises an endless track 33 encompassing the top frame portion 3 and in spaced relation thereto and supported thereon by brackets 34. On the track is mounted a carriage comprising a plate 35 having a pair of inverted U shaped elements 36 pivotally connected thereto as at 37. In each element 36 is journaled a wheel as 38 positioned to roll on the top edge of track 33. On each bottom edge of each element 36 is journaled a depending wheel or roller as 39 disposed to engage the opposite sides of the track 33. The plate 35 is pivotally mounted at its center on an overlying clamp 40 as at 41.

The clamp 40 is fixedly secured to a bar 42 which parallels the top of the frame 3 and slidably engages a member 43 which in turn is pivotally mounted on the center of cross-piece 4 as at 44.

The bar 42 has its outer end projecting beyond the track 33 and terminates in a head 45 from which is suspended a platform 46 adapted to carry a motor 47 or any other useful implement.

The result of this construction is that when an animal is properly secured in position as heretofore described, any desired hoof may be operated upon easily and conveniently by lifting it into its nearest support 21, 21a, 21b, or 21c and securing it there, and then operating the turnbuckle thereon to secure the desired inclination of the hoof. The hoof being properly positioned the platform 46 and its load are moved into a convenient position merely by applying a lateral force thereto, this force causing the carriage to travel to any desired position on the track 33.

Since the bar 42 is fixed to the carriage the overhang of the platform does not vary, but the varying distance between the carriage and the pivotal member 43 is compensated for by the sliding of the bar in member 43.

It will be noted that the track 33 is rounded at the four corners, and that the pivotal connections of the carriage members readily permit the carriage to travel around the corners as easily as along the straight sides.

It will further be noted that the two front hoof holding devices differ from the rear ones only in that they are mounted on vertical members 49 instead of on an inclined rail.

Although but one specific embodiment of the invention has been illustrated and described herein, it will be understood that various alterations in the details of construction and mode of assembly and operation may be made without departing from the scope of the invention as indicated in the appended claims.

I claim:

1. In combination, a cattle stall including an elevated frame, a sling depending from the frame and disposed to underlie the body of an animal in the stall, means associated with the frame operative to raise or lower the sling, a foot holding device disposed adjacent each corner of the stall, a horizontal track encompassing the top edge of the stall, a carriage mounted on the track, a member pivotally mounted on the top of the stall, a horizontal bar slidably mounted in said member and fixedly seated on said carriage and projecting beyond said track, and a tool carrying platform depending from the projecting end of said bar.

2. In a structure of the character indicated, the combination of a cattle stall including an elevated frame, a foot holding device disposed adjacent each corner of the frame, a horizontal track encompassing the top edge of the stall, a carriage mounted on the track, a member pivotally mounted on the top of the stall, a horizontal bar slidably mounted in said member and fixedly seated on said carriage and projecting beyond said track, and a tool carrying platform depending from the projecting end of said bar.

3. The structure set forth in claim 2 wherein the carriage comprises a horizontal plate, a bar clamp pivotally mounted thereon, an inverted U shaped member pivotally underlying each end of the plate, a wheel journaled in each member to engage the top edge of the track, and a wheel journaled on the bottom of each side of each member to engage opposite sides of the track.

4. In a structure of the character described, the combination of a cattle stall including an elevated frame, a foot holding device disposed adjacent each corner of the frame, a horizontal track disposed about the upper portion of the stall, a carriage mounted on the track, an extensible member pivotally mounted on the top of the stall and seated on said carriage, and a tool carrying platform depending from said member in spaced relation to said stall.

5. In a structure of the character described, the combination of a cattle stall including an elevated frame, a foot holding device disposed adjacent each corner of the frame, a track mounted on the upper portion of the frame, a carriage mounted on the track, an extensible member pivotally mounted on said frame to move in a horizontal plane and seated on said carriage, and tool carrying means suspended from said member in spaced relation to the frame.

MILTON YOUNG.